Feb. 25, 1936.  A. C. GILBERT ET AL  2,031,770
KITCHEN UTILITY DEVICE
Filed Dec. 30, 1932  3 Sheets-Sheet 1

Inventors
Alfred C. Gilbert
Arthur A. Arnold
By Rockwell & Bartholow
Attorneys

Feb. 25, 1936.  A. C. GILBERT ET AL  2,031,770
KITCHEN UTILITY DEVICE
Filed Dec. 30, 1932   3 Sheets-Sheet 2
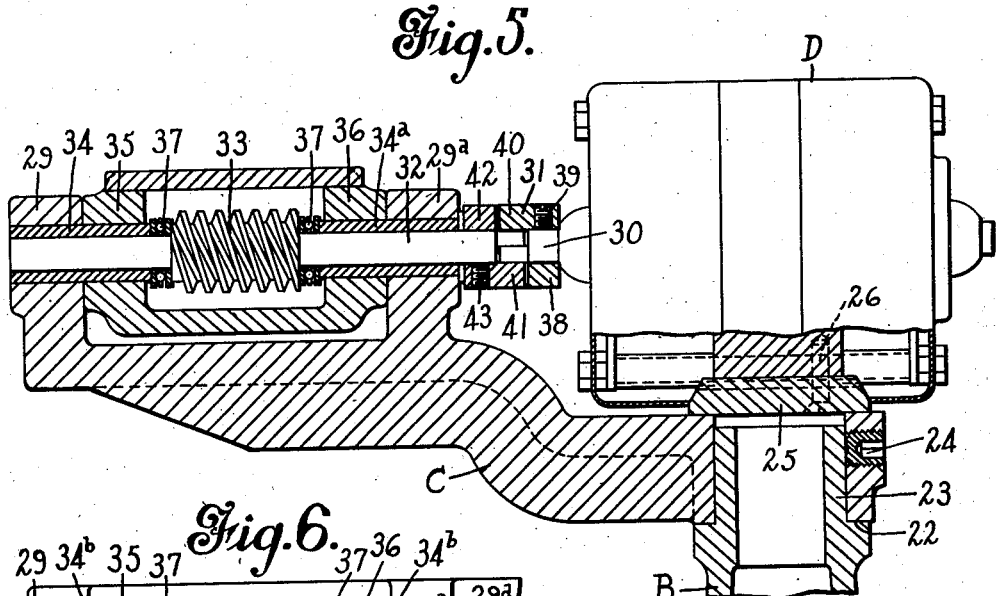
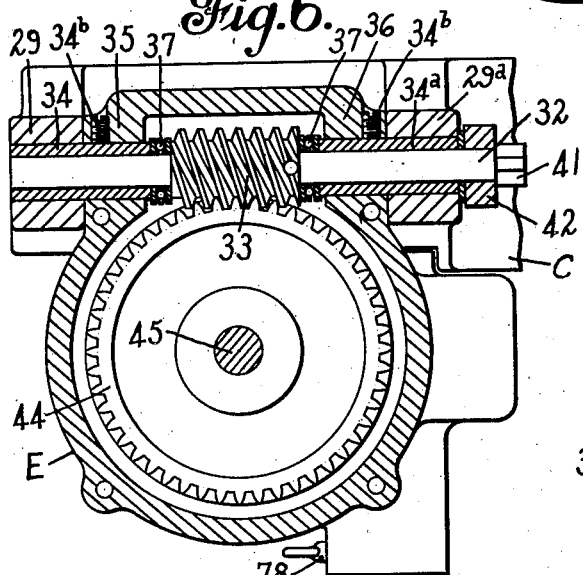
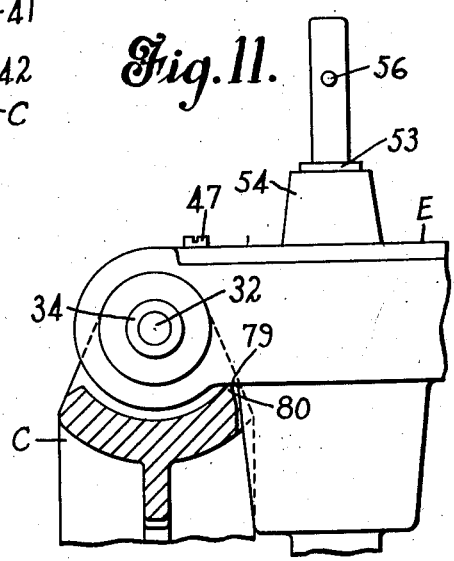
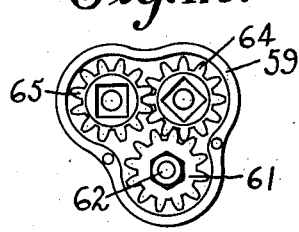

Feb. 25, 1936.  A. C. GILBERT ET AL  2,031,770
KITCHEN UTILITY DEVICE
Filed Dec. 30, 1932  3 Sheets-Sheet 3
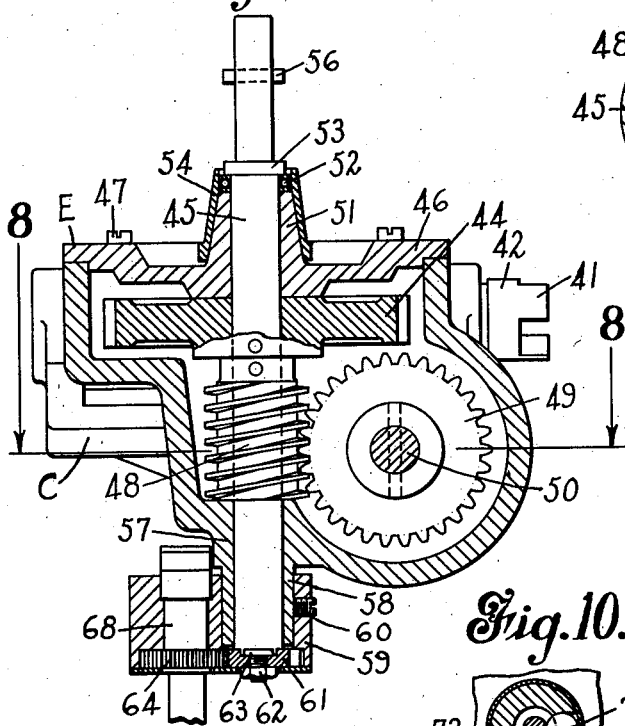
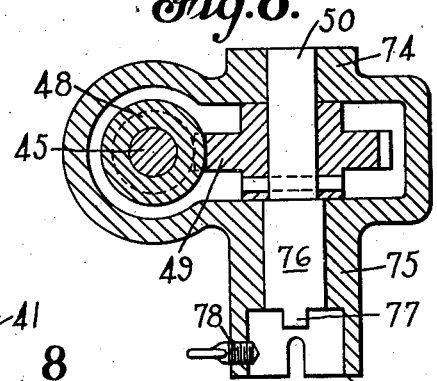
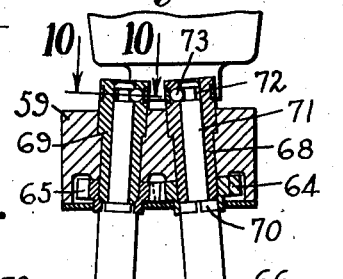
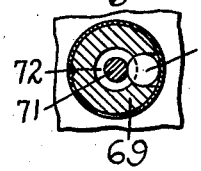
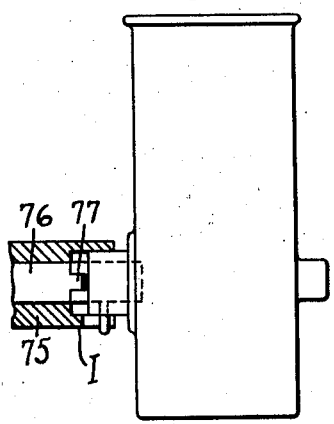

Patented Feb. 25, 1936

2,031,770

UNITED STATES PATENT OFFICE 2,031,770

KITCHEN UTILITY DEVICE

Alfred C. Gilbert, North Haven, and Arthur A. Arnold, New Haven, Conn., assignors to The A. C. Gilbert Company, New Haven, Conn.

Application December 30, 1932, Serial No. 649,581

9 Claims. (Cl. 259—131)

This invention relates to kitchen utility devices of the type in which an electric motor supplies the required power for performing various operations such as mixing or beating materials, extracting fruit juices, etc.

One of the objects of our invention is to furnish a device of this character which is very powerful and sturdy and can be conveniently used by the housewife.

Another object is to provide a kitchen utility device of enlarged scope.

Another object is to bring about an improved arrangement of parts whereby one or more agitators depending into a suitable mixing receptacle and driven from above by an electric motor can be moved to an inoperative position so as to clear the bowl or receptacle and enable the latter to be withdrawn from position in or on the mixer.

Another object is to provide improved means of connection between an operative element such as an agitator shaft or juice extractor shaft and an electric motor by means of which the element is driven.

To these and other ends the invention consists in the novel features and combinations of parts to be hereinafter described and claimed.

In the accompanying drawings:

Fig. 5 is an enlarged section on line 5—5 of Fig. 3;

Fig. 6 is an enlarged section on line 6—6 of Fig. 2;

Fig. 7 is an enlarged section on line 7—7 of Fig. 1;

Fig. 8 is a section on line 8—8 of Fig. 7;

Fig. 9 is an enlarged section on line 9—9 of Fig. 2;

Fig. 10 is an enlarged section on line 10—10 of Fig. 9;

Fig. 11 is a fragmentary end elevation of the swinging member carrying the agitator shafts, the supporting bracket to which said member is hinged being shown in transverse section;

Fig. 12 is a fragmentary bottom view showing the small gear case from which the agitator shafts are supported, the bottom member of this gear case being removed in order to show the gearing; and Fig. 13 shows an ice cube breaker mounted in the power socket and attached to the power shaft for operation thereby.

Figure 1:
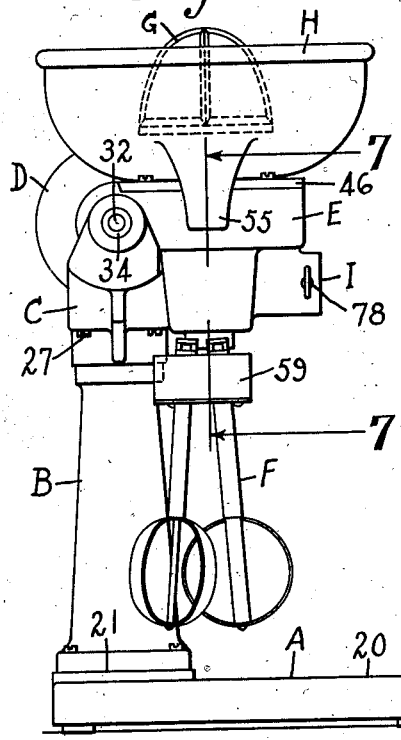
Fig. 1 is an end view of a kitchen utility device embodying our improvements showing two depending agitator shafts, a fruit reamer and a juice-collecting bowl in position on the appliance.

It has been proposed heretofore to provide a kitchen utility device with a base adapted to support bowls of different diameters, a pedestal rising from the base, a bracket pivoted to the pedestal to swing in a vertical plane, an electric motor associated with the bracket, and agitator shafts driven from gears associated with the outer or overhanging end of the motor. In such a structure the motor swings with the bracket carrying the agitators, and the plane of tilting of the bracket is more or less alined with or parallel to a vertical plane passing through the motor shaft, which shaft is usually horizontally disposed. According to our present improvements there is a considerable departure from the arrangement just described in at least two respects. In the first place, the motor is stationary and does not move when the agitators are tilted to move them into or out of the receptacle on the base, although the motor remains, nevertheless, in driving connection with the agitator or agitators. In the second place, the agitator or agitators, instead of swinging in a plane alined with or parallel to a vertical plane passing through the motor shaft, tilt in a vertical plane substantially at right angles to the motor shaft. These and other novel features of our present device will appear more clearly as the description proceeds.

In its general features our device as particularly illustrated herein comprises a base adapted to support bowls of different sizes and shapes; a pedestal rising from the base; a bracket extending forwardly from the pedestal and at all times substantially rigid therewith; a gear-containing casing pivoted to said bracket to swing in a vertical plane substantially at right angles to the longitudinal axis of the motor and transversely of the base; agitator shafts depending from said casing adapted to project down into a receptacle supported on the base; an electric motor supported substantially immovably on the pedestal and coupled with the gearing in the gear casing so as to drive the agitator shafts; an extractor shaft projecting upwardly from the gear casing and adapted to drive a reamer located in a juice-collecting and delivering bowl, which may be supported on top of the swinging arm member; and a power outlet socket associated with a power shaft within the swinging gear casing and adapted for the connection of various devices to be driven at a relatively low speed, such as an ice cube breaker, food chopper, coffee grinder, or the like.

In the example selected for illustration the base is indicated generally at A, the pedestal at B, the rigid forwardly projecting bracket at C, the motor at D, the swinging gear case containing gearing driven from the motor, at E, the depending agitators at F, the fruit reamer at G, the juice-collecting bowl at H, and the power socket at I.

The base A may be of any of a number of different forms, but it comprises essentially a portion suitable for supporting the pedestal B and another portion suitable for positioning any of a number of bowls or other receptacles of different sizes and shapes. The bowl-supporting portion of the base is shown at 20 and the pedestal-supporting portion at 21, and it will be observed that these portions are substantially at right angles to each other in the particular example shown so that the base is substantially L-shaped in plan. The pedestal B is secured in a suitable manner to the portion 21 of base A, and the bracket C is suitably connected to the upper end of the pedestal so as to project therefrom forwardly in a position to overhang base portion 20. The motor D is preferably supported on top of the pedestal at a point adjacent the place where the bracket is attached to the latter. Pedestal B is preferably made hollow and of round cross-section, and near its upper end it presents an upwardly facing outwardly projecting annular shoulder 22. The cylindrical portion above the shoulder 22 is indicated by reference character 23, and this cylindrical portion snugly fits a correspondingly shaped socket in the end portion of bracket C. At its rear end the lower face of bracket C contacts with and is supported by the annular shoulder 22. A screw plug 24 passing through the wall of the socket in the end portion of the bracket is adapted to engage cylindrical portion 23 so as to secure the bracket tightly and rigidly to the pedestal.

The motor D can be attached to the upper part of the pedestal structure in any convenient manner. In the present instance it rests on the upper surface of bracket C adjacent the socket in the bracket in which the upright pedestal member fits. In the example illustrated, the motor D has a base block 25 applied to the cylindrical surface thereof at the lower part by means such as screws 26, and the base block is in turn attached to the flat upper face of bracket C by means such as bolts 27 extending through flanges 28 at the respective sides of the bracket. The upper ends of the bolts 27 are threaded into the base block 25, and in this manner the motor D can be firmly held in place.

The bracket C is of approximately T-shaped formation throughout its length, having a depending web as well as laterally extending side flanges. At the outer end portion of the bracket the same is offset somewhat with respect to the portion attached to the upper end of the pedestal, the outer portion being in a somewhat higher plane. This outer portion in the particular example shown has upwardly extending lugs 29, 29ᵃ projecting from the upper face thereof, and it is between these lugs that the gear case member E is swingingly mounted. These lugs are perforated and the perforations therein are in line with the shaft 30 of motor D. Shaft 30 is coupled by means of a coupling member 31 with a worm shaft 32 journaled in the lugs 29, 29ᵃ, said shaft 32 having thereon a worm 33 disposed in case E. The outer ends of shaft 32 are received in bushings or sleeves 34, 34ᵃ of brass or other suitable bearing metal, and these bushings or sleeves are located in the perforations or openings of lugs 29, 29ᵃ, and also extend through upright side wall portions 35 and 36, respectively, of gear case E. Anti-friction thrust bearings 37 are preferably interposed between the ends of worm 33 and the corresponding ends of bushings 34, 34ᵃ. The worm shaft 32 and associated sleeves act in the nature of a pintle, and the lugs 29, 29ᵃ and interposed gear case portion act in the nature of knuckles whereby the gear case is hingedly mounted on bracket C to swing in a plane transverse to the axis of motor D.

The coupling between worm shaft 32 and motor shaft 30 is of a detachable character and preferably comprises a clutch member 38 attached to shaft 30 by a screw 39 and having forwardly extending clutch jaws 40 engaging corresponding clutch jaws 41 on a member 42 secured to the end of shaft 32 by a screw 43. Other forms of couplings may, however, be used if desired.

The upper portion of gear case E contains a comparatively large gear 44 shown as a spiral gear meshing with the worm 33. Gear 44 is pinned to a vertical shaft 45 journaled in the gear case E. Over the gear 44 the case E is provided with a detachable cover 46 providing an upper bearing for shaft 45. Cover 46 is detachably secured to the gear case by means such as screws 47. At its lower portion the gear case is provided with a bearing for the lower end portion of shaft 45. Below gear 44 shaft 45 is provided with a worm 48 fixed thereto in a suitable manner and meshing with a spiral gear 49 on a so-called power shaft 50. This power shaft 50 serves for the operation of attachments using considerable power, such as food choppers, ice cube breakers, and the like. The upper end portion of shaft 45 projects upwardly out of the gear case and is detachably coupled with fruit reamer G. The juice-collecting bowl H may be conveniently positioned on top of the gear case E. The lower end portion of the shaft 45 serves to drive the agitators F in the manner hereinafter more particularly described.

Figure 2:
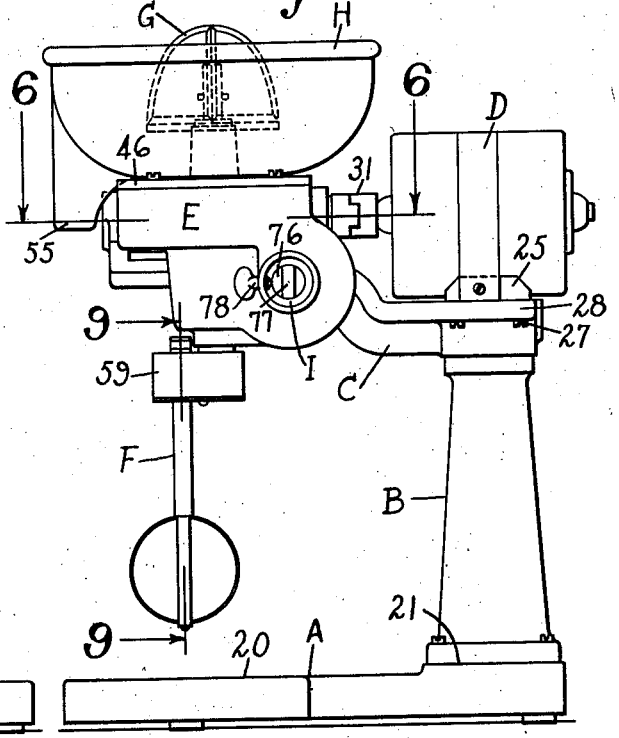
Fig. 2 is a side elevation of the appliance.
Figure 3:
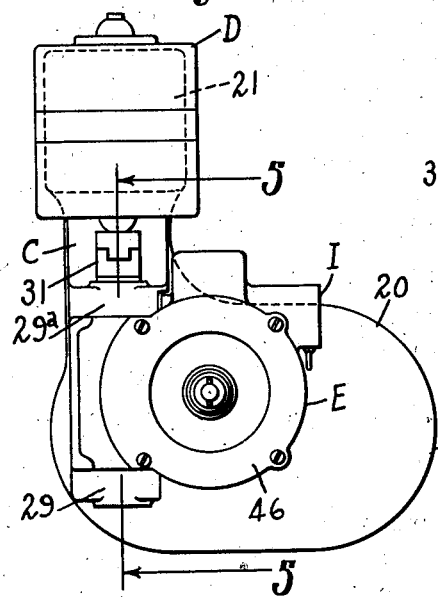
Fig. 3 is a top plan view of the same.

The upper bearing for the vertical shaft 45 may be constituted in part by a sleeve 51 projecting upwardly from cover 46. On top of this sleeve is an anti-friction thrust bearing 52 located beneath a collar 53 formed on or secured to the upper end portion of the shaft. Surrounding the sleeve 51 and bearing 52 is a metal collar 54 which preferably tapers from end to end so as to be smaller at the upper end than at the lower end. This collar encloses the anti-friction bearing and also serves to center the juice-collecting bowl H, which has a correspondingly shaped opening through its bottom. The bowl may be supported in the relation shown in Figs. 1 and 2, with its discharge spout 55 located at one end of the appliance so as to clear the gear case but being close to the gear case. It will be understood that a portion of the bottom of the bowl rests on the cover of the gear case. The reamer G preferably detachably engages a transverse pin 56 near the upper extremity of shaft 45. After disengaging the reamer from the shaft, the bowl H can be readily removed from the appliance by lifting it upwardly.

The lower bearing for shaft 45 is preferably constituted by a sleeve portion 57 integral with the lower part of the gear case. Beyond this bearing 57, the gear case is provided with an integral extension sleeve 58 to which is connected preferably in a detachable manner a small housing 59 containing agitator gears and constituting in effect a portion of gear case E. The small case 59 has a socket in which sleeve 58 is received, and a screw 60 detachably holds sleeve 58 in its socket. On the lower extremity of shaft 45 a small spur gear 61 is secured by a bolt 62, shaft 45 having a squared portion 63 fitting a correspondingly shaped socket in the upper face of gear 61. Gear 61 meshes with a spur gear 64 in gear case 59, and gear 64 meshes with and drives a further spur gear 65. The gear 64 is positioned about and drives spindle 66 of one of the agitators, and gear 65 is disposed about and drives the spindle 67 of the other agitator. At their lower portions the spindles 66, 67 are equipped with beater blades or agitating elements of any desired form. Spur gear 64 is rigidly secured to a hub member 68 rotatable in case 59, and gear 65 is rigidly secured to a similar hub member 69. The upper ends of these hub members 68, 69 project upward slightly out of case 59. In its upper portion spindle 66 is provided with a squared portion 70 adapted to engage a correspondingly shaped socket in the lower part of gear 64, so that the spindle is non-rotatively engaged with the gear. Above portion 70, spindle 66 has a cylindrical portion 71 having near the upper extremity thereof an annular groove 72 adapted to be engaged by spring-pressed anti-friction ball 73 for the purpose of yieldingly securing the spindle in driving engagement with its associated gear. It will be understood, however, that when it is desired to remove the spindle from the gear, this may be done by exerting a relatively small amount of downward force on the spindle. The spindle 67 is mounted in substantially the same manner as spindle 66. Either spindle may be removed without interfering with the operation of the other as the gears 64, 65 are rotated whenever shaft 45 is rotated, the drive being from gear 61 to gear 64, and from gear 64 to gear 65.

Reverting now to the power shaft 50, previously mentioned, it will be observed that in this particular instance this shaft is located nearer motor D than is shaft 45, and approximately at right angles to the motor shaft. Shaft 50 is relatively short and has end bearings 74, 75 in the gear case. The power socket I preferably is on the side of the gear case remote from the hinged connection of said case with the bracket C. Preferably this power socket is located somewhat above the point where the upper ends of the agitators F are attached to the casing and somewhat below the upper face of the gear case on which the juice-collecting bowl is supported. Shaft 50 has a somewhat enlarged cylindrical portion 76 on the forward end thereof provided on its end face with a tenon 77 extending into the projecting sleeve which constitutes the so-called power socket. A device such as an ice cube breaker may be attached to the power socket, a projecting portion of the ice cube breaker or other device entering the power socket and being held therein by a clamping screw 78, and the ice cube breaker or other appliance having an operating shaft with a notched end in which tenon 77 fits. This power shaft may be used for operating other appliances than an ice cube breaker, for example, a food chopper or a coffee grinder. The gearing is such that the shaft 50 will rotate quite slowly and with ample power for operating such attachments as ice cube breakers, food choppers, etc.

Figure 4:
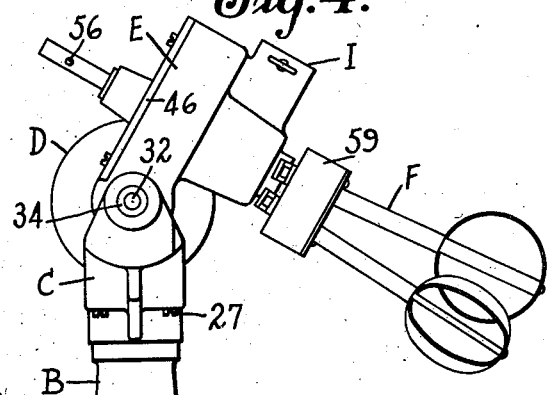
Fig. 4 is a fragmentary front end view showing certain parts illustrated in Fig. 1, the fruit reamer and juice bowl being omitted, and the agitators being shown in the position to which they are swung upwardly to clear the receptacle on the base.

It will be observed from Fig. 11 that in the region below the hinged connection of gear case E to the motor bracket the flanged upper portion of the motor bracket is curved so as to conform in a general way to the curvature of the knuckle portion of the gear case in which the worm 33 is housed. A flat portion 79 on the gear case at the upper part thereof is adapted to engage the margin 80 of the bracket flange in the manner shown in Fig. 11 for the purpose of holding the gear case E firmly in a position in which the shaft 45 is substantially vertical. Supposing, however, that the agitators F have been used for agitating the contents of a bowl mounted on base A, and the agitation has been completed, the agitators can be moved out of the bowl by tilting the gear case on its hinge in the manner shown in Fig. 4. In this operation the agitators swing in a vertical plane substantially at right angles to a vertical plane passing through the shaft of the motor. When the agitators have been swung upward to a sufficient extent the bowl or other receptacle can be readily removed from the base. When the agitators are tilted the motor D does not move, but nevertheless the motor remains in driving connection with the agitators by reason of the fact that the motor shaft is coupled to the worm shaft 32 whose axis coincides with the hinging line of the gear case.

When the agitators F are swung in the manner described, they move in a plane in which both the agitator spindles are disposed.

In mixing a beverage it is usual to remove one of the agitators and to employ a single agitator extending down into a glass resting on the base.

When the device is in operation the worm shaft 32 rotates in the brass or like sleeves 34, 34ª which form extended bearings for said shaft in the lugs 29, 29ª and in the interposed wall portions of the gear case. These bearing sleeves are preferably fixed to the gear case by means such as the screws 34ᵇ shown in Fig. 6. When the case is swung up and down (at which time the motor is usually not in operation), the sleeves 34, 34ª turn in the lugs 29, 29ª.

Various changes can be made in the details of the structure without departing from the scope of our invention as defined in the claims. We have not attempted to describe the various modifications which may be made without departing from the principles of our invention.

What we claim is:

1. In a device such as described, the combination of a base, a pedestal rising therefrom, a bracket on the pedestal, a motor on the bracket, a gear case adjacent one end of the motor, a vertical shaft in said gear case, an agitator driven from the lower end portion of said vertical shaft and adapted to stir the contents of a receptacle supported on the base, a gear element on said vertical shaft within the gear case, gearing interposed between said gear element and the motor shaft, and a power shaft arranged transversely with respect to the bracket and driven from said vertical shaft and having a socket associated therewith for the connection of various accessory appliances, said power shaft being located in a plane below the plane of the motor shaft.

2. In a device such as described, the combination of a base, a pedestal rising therefrom, a bracket on the pedestal, a motor on the bracket, a gear case adjacent one end of the motor, a vertical shaft in said gear case, an agitator driven from the lower end portion of said vertical shaft and adapted to stir the contents of a receptacle supported on the base, a gear element on said vertical shaft within the gear case, gearing interposed between said gear element and the motor shaft, and a power shaft arranged transversely with respect to the bracket and driven from said vertical shaft and having a socket associated therewith for the connection of various accessory appliances, said power shaft being located in a plane below the plane of the motor shaft and being disposed on the motorward side of said vertical shaft.

3. In a device such as described, the combination of a base, a laterally extending bracket supported from the base, a motor on the bracket, a gear case adjacent one end of the motor casing, a vertical shaft journaled in said gear case, worm gearing for driving said vertical shaft from the motor shaft comprising a worm rotating on a horizontal axis and a worm gear meshing with said worm and fixed to said vertical shaft, an agitator element depending from the gear case, means for driving said element from said vertical shaft, a power shaft located below the motor shaft and below and transversely to the gearing connecting the vertical shaft with the motor shaft, and a socket on the gear case associated with said power shaft for the connection of various accessory appliances.

4. In a device such as described, the combination of a base, a pedestal rising therefrom, a bracket secured to the upper end of the pedestal and having a fixed arm extending over the base, a motor fixed in position at the top of the pedestal, an agitator-carrying member having pivotal relation to the outer end portion of said arm, an agitator carried by said member and normally having a pendant position but adapted to be tilted with the agitator-carrying member, and means for driving the agitator from the motor.

5. In a kitchen utility device, a base, a pedestal rising therefrom, a fixed bracket extending laterally from the pedestal, an electric motor fixedly supported above the bracket and having its shaft horizontally disposed, an agitating device mounted pivotally on the bracket over the base to tilt in a plane substantially at right angles to the motor shaft, the pivot of said agitating device being in line with said motor shaft, and means for driving said agitating device from the motor shaft.

6. A household mixer comprising a receptacle-supporting base having an upwardly extending pedestal, a bracket on the pedestal having spaced relation to the base and overhanging the same and provided with a pair of perforated lugs extending therefrom, a gear case pivoted between said lugs, a shaft mounted in said lugs and carrying a worm, means including an electric motor fixedly mounted on said pedestal connected with said shaft to drive the same, gears in the gear case driven from said worm, and an exterior depending agitator element carried by the gear case and movable therewith and driven from said gears, said agitator element when moving with the gear case being adapted to swing into and out of a receptacle supported on said base.

7. A household mixer comprising a base substantially L-shaped in plan having one of its leg portions adapted to support a receptacle, a pedestal rising from the end of the other leg portion of the base, an electric motor rigidly mounted on top of the pedestal and having a horizontal shaft, a depending agitator pivoted to swing in a plane directed transversely to the motor shaft and lengthwise of the first-mentioned leg portion of the base on which the receptacle is supported, and means operatively connecting the agitator with the motor shaft for driving the agitator, said means being operative irrespective of the swinging of the agitator.

8. A household mixer comprising a base, a pedestal rising therefrom, said base having a receptacle-supporting portion at one side of said pedestal, a stationary arm-like bracket extending forwardly from the pedestal over the receptacle-supporting portion of the base and supported from the pedestal, a pair of agitators lying in substantially the same vertical plane, said plane being transversely directed with respect to said arm-like bracket, means supporting the agitators so that they may be swung in such vertical plane into and out of a receptacle supported on the base, an electric motor fixedly supported on said bracket and having a horizontal shaft directed longitudinally of the bracket, and means for driving the agitators from said motor, said means being operative in the different positions to which the agitators are swung.

9. A household mixer comprising a base, a pedestal rising from said base, an electric motor mounted on the pedestal and having a horizontal shaft directed longitudinally of the base, a gear housing adjacent one end of the motor, a vertical shaft journaled in said gear housing and driven from the motor shaft, the upper end of said vertical shaft projecting beyond said gear housing, a reamer on the upper end of said vertical shaft, a pair of gears in said gear housing driven from the motor shaft, agitators removably connected to and depending from said gears and adapted to stir the contents of a receptacle supported on said base, a horizontal power shaft having bearings in said gear housing, reduction gearing for driving said power shaft from said vertical shaft, and a power socket associated with said power shaft for the connection of various accessory appliances to the latter, said power shaft being transverse to and below the motor shaft and said power socket being located at the side of the gear housing between the motor and the gears which drive the agitators.

ALFRED C. GILBERT.
ARTHUR A. ARNOLD.